United States Patent [19]
Dwyer

[11] Patent Number: 6,107,707
[45] Date of Patent: Aug. 22, 2000

[54] ANTI-RESONANCE SOLUTIONS FOR STEPPER MOTORS

[75] Inventor: Patrick H. Dwyer, Penn Valley, Calif.

[73] Assignee: Aim Controls, Inc., Penn Valley, Calif.

[21] Appl. No.: 09/148,064

[22] Filed: Sep. 4, 1998

Related U.S. Application Data

[60] Provisional application No. 60/057,947, Sep. 5, 1997.

[51] Int. Cl.[7] ..................................................... H02K 5/24
[52] U.S. Cl. ............................... 310/51; 310/89; 310/118; 310/119; 310/121
[58] Field of Search .............................. 310/51, 89, 118, 310/119, 121

[56] References Cited

U.S. PATENT DOCUMENTS

| | | | |
|---|---|---|---|
| 5,026,476 | 6/1991 | Ishimoto et al. | 210/89 |
| 5,210,453 | 5/1993 | Nelson | 310/51 |
| 5,402,024 | 3/1995 | Watanabe et al. | 310/156 |
| 5,521,447 | 5/1996 | Bertolini et al. | 310/51 |
| 5,609,230 | 3/1997 | Swinbanks | 188/267 |
| 5,612,583 | 3/1997 | Crucq et al. | 310/90 |
| 5,786,647 | 7/1998 | Vollmer et al. | 310/89 |
| 5,796,203 | 8/1998 | Wang | 310/233 |
| 5,905,320 | 5/1999 | Periyathamby et al. | 310/89 |
| 5,914,550 | 6/1999 | Periyathamby et al. | 310/91 |

Primary Examiner—Nestor Ramirez
Assistant Examiner—Thanh Lam
Attorney, Agent, or Firm—John P. O'Banion

[57] ABSTRACT

An apparatus and method for the reduction of the effects of resonant mechanical waves that exert clockwise or counter-clockwise forces that act upon the output shaft of a stepper motor such that the dynamic relationship between the stator and rotor in a stepper motor is adversely affected, thereby reducing torque or even stalling the stepper motor.

6 Claims, 4 Drawing Sheets

ANTI-RESONANCE SOLUTIONS FOR STEPPER MOTORS

CROSS-REFERENCE TO RELATED APPLICATIONS

This application claims priority from U.S. provisional application Ser. No. 60/057,947 filed on Sep. 5, 1997, which is incorporated herein by reference.

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

1. Field of the Invention

This invention pertains to certain means of counteracting the negative effects of mechanical resonances on the operation of stepper motors. More particularly, it concerns the reduction of the effects on stepper motors of resonant wave(s) in a machine or device to which a stepper motor is attached. As used hereafter, the term "stepper motor" refers primarily to the "hybrid" type stepper motor; however, the same principles would also apply to the permanent magnet, variable reluctance, canstack, axial airgap and other types of stepper motor designs where the stator is mechanically affixed to the outer motor housing.

Such waves are the natural result of mechanical resonance(s) in any particular machine or device. These mechanical waves of energy, when coupled to a stepper motor's rotor assembly (through the motor output shaft) and/or stator assembly (through the motor's case) can substantially increase the amount of energy required for a stepper motor to continue its rotational movement from one magnetic pole to the next. The result can range from an increase in the electrical energy required by the stepper motor for the same amount of output torque (at a given speed), to the complete stalling of the stepper motor.

The present invention consists of an apparatus and method for counteracting the negative effects on the operation of a stepper motor of mechanical resonances in a particular machine or device. The primary results of the present invention is a substantial increase in a stepper motor's speed range and a significantly improved torque curve.

2. Description of the Background Art

It is well known in the field of stepper motors that each particular stepper motor will have one or more resonant points over its frequency range of operation. The size, mechanical construction, air gap and many other physical characteristics of a stepper motor vary over a wide range, thereby resulting in a divergence of inherent stepper motor resonances. There are also mechanical resonances in any machine or device to which a stepper motor may be attached.

When a stepper motor is attached to any machine or device, the stepper motor, along with such machine or device, become one system that will have its own unique mechanical resonances. These "system" resonances can cause problems with the operation of a stepper motor, including increased demand at certain operating frequencies for electrical energy (for the same torque output), to the complete stalling of the stepper motor.

To date, there have been very limited and rather unsuccessful efforts to counteract the negative effects of such stepper motor/machine system resonances. Rather, it is the custom in the industry to operate a particular stepper motor within a frequency range in which it is not seriously affected by any system resonance.

Another common industry approach to the problem of system resonances has been to use an isolation mounting technique similar to that used in the mounting of a variety of mechanical devices, including internal combustion engines, transmissions, and other types of electrical motors. This approach involves the partial separation of the stepper motor from the machine or device by means of a flexible standoff, usually made from rubber (or similar flexible material), that lowers the total energy of the mechanical waves moving towards or from the stepper motor in the direction parallel to the stepper motor's rotor assembly. Such isolation mounting devices operate within a limited frequency range (depending upon the type and shape of the isolating material), and are directed at reducing the amount of transmitted and reflected energy that is moving in a linear direction parallel with respect to the stepper motor's rotor; such types of isolation mounts do not significantly affect the amount of mechanical wave energy that is transmitted to or from the stepper motor in a direction that is perpendicular to the stepper motor's rotor assembly (i.e., mechanical waves moving energy clockwise or counterclockwise with respect to the motion of the rotating rotor assembly of the stepper motor).

Another common industry approach is the use of viscous dampers placed on the output shaft of the stepper motor. These are designed to act in a manner similar to a flywheel by temporarily smoothing out short term various in torque. However, such devices, like isolation mounts, do not directly deal with the problem of the mechanical waves interfering with the relationship of the stator assembly and the rotor assembly inside the stepper motor. They also have the disadvantage of adding drag to the output shaft at all speeds, thereby wasting energy. Lastly, they do not significantly improve dynamic speed range, but in fact, may decrease maximum speed capability.

BRIEF SUMMARY OF THE INVENTION

To overcome the foregoing deficiencies, the present invention is specifically designed to counteract the effect of mechanical waves moving clockwise or counterclockwise to the rotor assembly of the stepper motor, thereby substantially decreasing the amount of energy at a resonance point that a stepper motor must use to continue its rotational movement with the same amount of torque. This invention has the advantage of requiring less energy into the stepper motor and a very substantial increase in dynamic speed range (increases of over 100% have been observed).

In accordance with an aspect of the invention, the effect of mechanical energy waves that exert rotational forces upon the rotor assembly of a stepper motor that are detrimental to the torque output and dynamic speed range of said stepper motor is reduced by employing a mounting bracket that is capable of holding a stepper motor in a manner that permits the stator assembly of the stepper motor to rotate clockwise or counterclockwise relative to the rotor assembly, depending upon the direction and amount of force on the rotor assembly exerted by said mechanical energy waves, and further providing means for adjusting the amount of clockwise or counterclockwise rotation of the stator assembly in response to the mechanical energy waves.

In accordance with another aspect of the invention, the effect of mechanical energy waves that exert rotational forces upon the rotor assembly of a stepper motor that are detrimental to the torque output and dynamic speed range of said stepper motor is reduced by providing a stepper motor housing that is capable of permitting the stator assembly in the stepper motor to rotate clockwise or counterclockwise relative to the rotor assembly in the stepper motor in a manner that depends upon the direction and amount of force on the rotor assembly exerted by the mechanical energy waves, and further providing means for adjusting the amount of clockwise or counterclockwise rotation of the stator assembly in response to the mechanical energy waves.

An object of the invention is to reduce the effects of resonant mechanical waves that exert clockwise or counterclockwise forces that act upon the output shaft of a stepper motor such that the dynamic relationship between the stator assembly and rotor assembly in a stepper motor is adversely affected, thereby reducing torque or even stalling the stepper motor.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 6. It will be appreciated that the apparatus may vary as to configuration and as to details of the parts, and that the method may vary as to details and the order of the steps, without departing from the basic concepts as disclosed herein.

Figure 1:
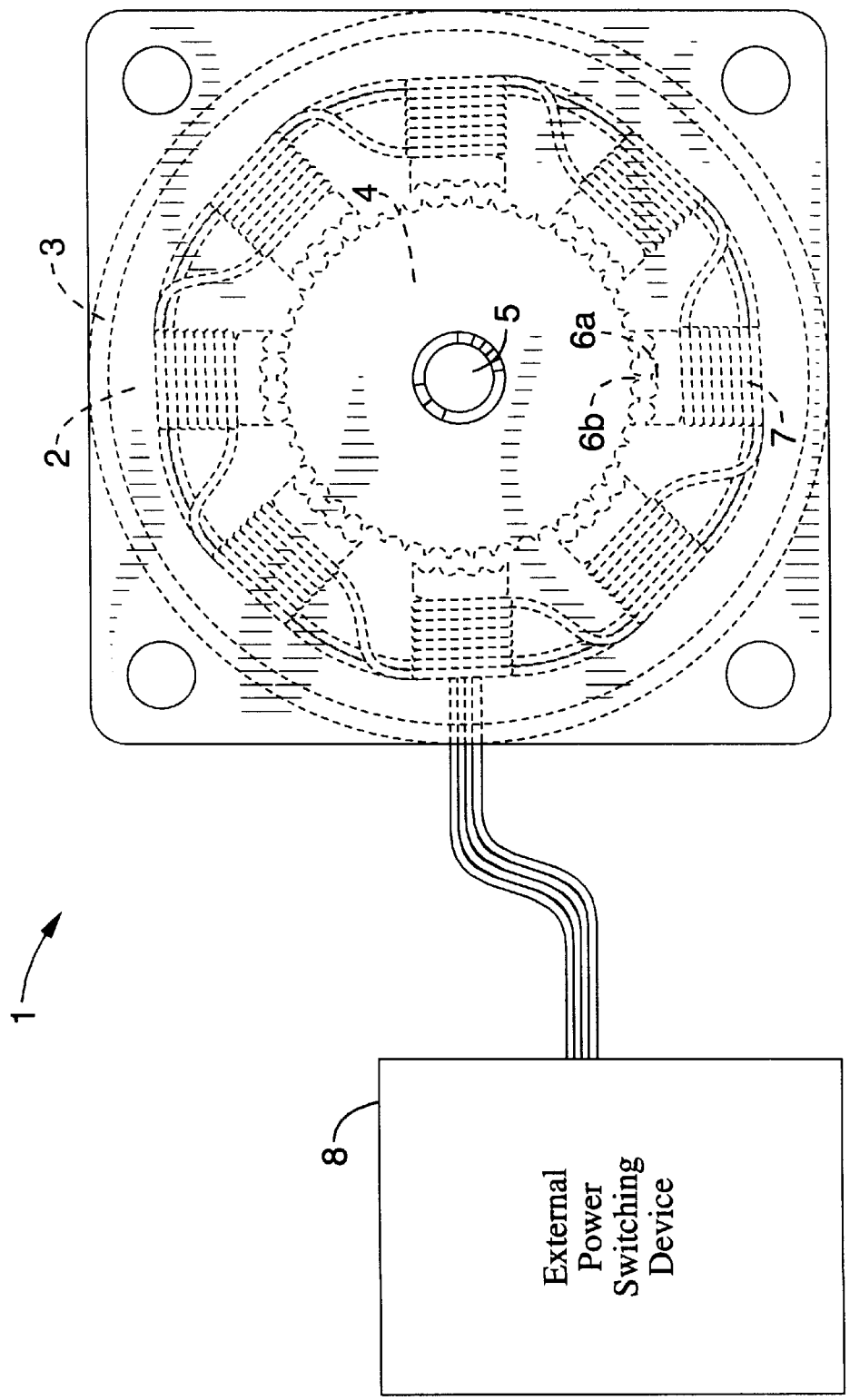
FIG. 1 schematically shows a stepper motor in cross-section connected to an external power switching circuit.
Figure 3:
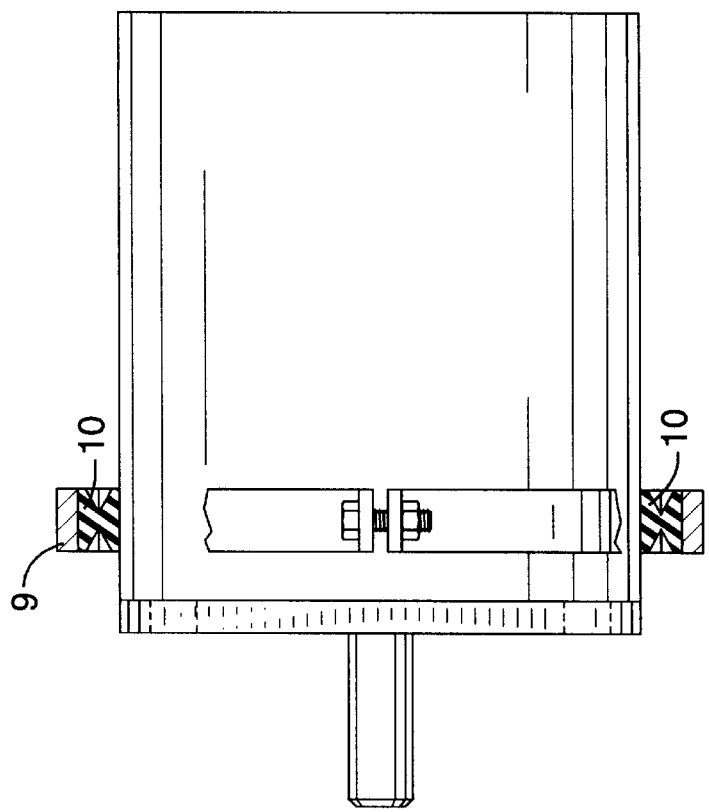
FIG. 3 shows a side view of a clasp for mounting a stepper motor in accordance with the invention, attached to a stepper motor.

Referring to FIG. 1, in a stepper motor 1, the stator assembly 2 is affixed, and stationary with respect to, the stepper motor's 1 external housing and frame 3. The rotor assembly 4 is mounted on the stepper motor's 1 output shaft 5. The positional relationship of the rotor assembly 4 to the stator assembly 2 is critical to the operation of a stepper motor 1. In a stepper motor 1, the magnetic poles 6(*a*) of the stator assembly 2 are energized by means of electric coils 7 wrapped around the magnetic poles 6(*a*) that are attached to an external power switching circuit 8. The electric coils 7 are energized in a particular sequence that causes the magnetic poles 6(*b*) on the rotor assembly 4 to be alternatingly attracted and repelled to the magnetic poles 6(*a*) on the stator assembly 2, thereby causing the rotor assembly 4 to move with respect to the stator assembly 2. Consequently, the output shaft 5 turns in relationship to the stepper motor's 1 external housing and frame 3.

When the stepper motor 1 is attached to any type of machine or device, the stepper motor 1 becomes mechanically coupled to such machine or device. This attachment will create a new mechanical system with its own unique physical properties that are a result of the combination of the stepper motor 1 and the attached machine or device. With respect to this invention, the most important element of the physical properties of such a "system" is the frequency(ies) of mechanical resonance(s) that such a system has.

When such a mechanical system nears a resonance point, very strong mechanical waves arise. If such a resonant mechanical wave is transmitted perpendicular to the rotary motion of the output shaft 5 of stepper motor 1, then it can strongly affect the physical relationship between the stator assembly 2 and the rotor assembly 4 due to the very large increase in the amount energy required for a magnetic pole 6(*b*) on the rotor assembly 4 to reach the next magnetic pole 6(*a*) on the stator assembly 3. To overcome this increased resistance, the existing industry technique has been to apply more energy to the electrical coils 7 by the power switching circuit 8.

At lower switching frequencies, most stepper motors 1 and power switching circuits 8 have sufficient reserve capacity to apply enough extra energy to the electrical coils 7 to overcome the effects of a resonance wave below 1,000 to 4,000 pulses per second, depending upon the particular stepper motor 1. However, at higher switching speeds (which is relative to the particular stepper motor 1), the power switching circuit 8 is not able to overcome the problem of resonance and the stepper motor 1 will operate at very reduced torque and/or stall at or near a resonance point.

The present invention approaches the resonance wave problem in an entirely different manner. By designing the mounting bracket for stepper motor 1 in such a manner as to permit a small amount of rotational movement of the external housing and frame 3 with respect to the rotor assembly 4, the physical relationship of stator assembly 2 and the rotor assembly 4 is also allowed to change. This enables the magnetic pole 6(*a*) of the stator assembly 2, towards which the magnetic pole 6(*b*) of rotor assembly 4 is traveling, to stay in the same relative physical position (or relationship) to the approaching magnetic pole 6(*b*) of rotor assembly 4 as happens at non-resonant frequencies, thereby using less energy than would otherwise be required bring the two magnetic poles 6(*a*) and 6(*b*) into alignment. This lower energy threshold is sufficient in most cases to enable the stepper motor I to continue operating normally rather than lose torque or stall without having to apply more energy to the electrical coils 7. Once the stepper motor 1 increases or decreases switching speed above or below the resonant mechanical frequency, the external housing and frame 3 returns to its original position. The stator assembly 2 and the rotor assembly 4 are then able to continue operating in a normal manner.

The present invention can be implemented both externally to, and internally in, the stepper motor 1. First, referring to FIG. 6, it can be incorporated into the stepper motor 1 itself; and second, referring to FIGS. 2 and 5, the invention can be incorporated into a variety of external mounting devices or brackets for holding stepper motor 1 to the particular machine or device. Similarly, referring to FIG. 2 through FIG. 4, a variety of flexible materials can be utilized to obtain a small amount of rotation of the external housing and frame 3 (and thus, stator assembly 2) with respect to the rotor assembly 4. Different materials (with different amounts of compliance) may have varying results on the performance. Experimentation to find the optimum materials for a particular size and type of stepper motor 1 for use on a particular machine or device would be an expected part of the utilization of this invention.

Figure 2:
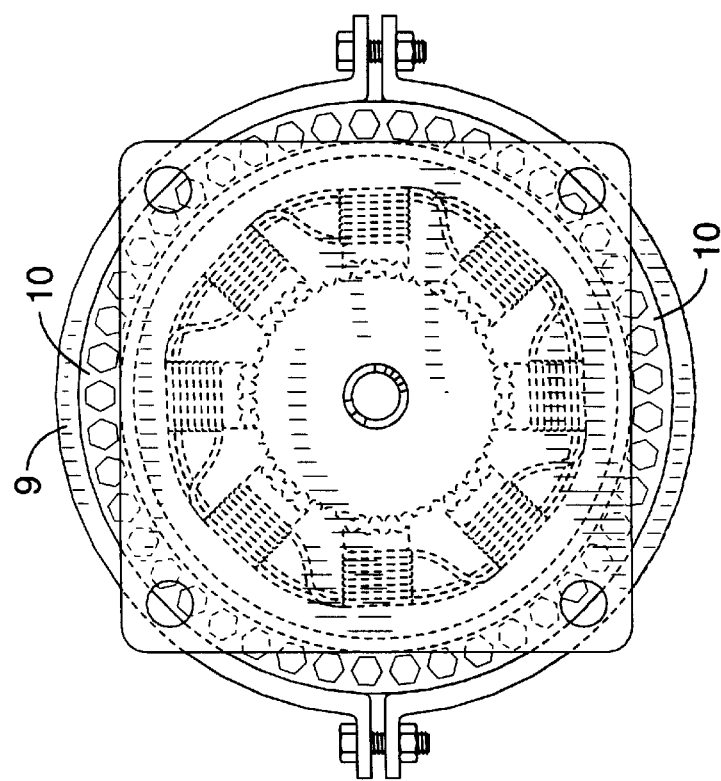
FIG. 2 shows a front view of a clasp for mounting a stepper motor in accordance with the invention, attached to a stepper motor.

The physical implementation of this invention, either externally to stepper motor 1 or internally in stepper motor 1 may be accomplished in many ways. Three means will be briefly described here by way of example, but not limitation. Referring to FIG. 2, a stepper motor 1 of standard construction can be held in a specifically designed mount 9 such as that shown diagrammatically. This type of mount basically acts like a clasp that holds the stepper motor 1 in place by the external housing and frame 3, yet allows for a small amount of rotation of the external housing and frame by means of the compliance characteristic of the rubber 10 (or other similar compliant material) placed between the mount 9 and the stepper motor 1.

Figure 5:
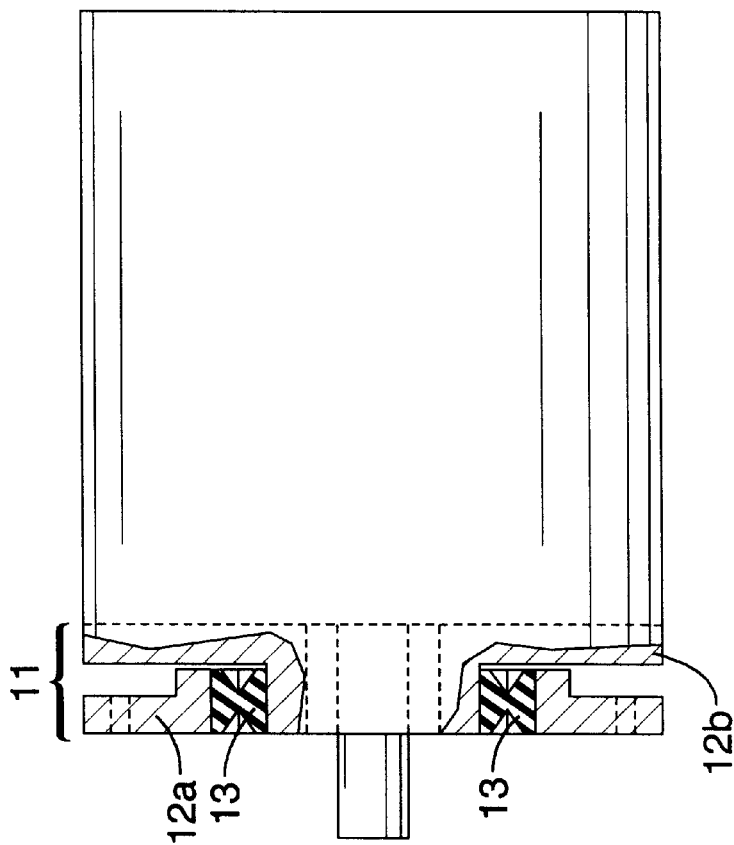
FIG. 5 shows a side view of a flange for mounting a stepper motor in accordance with the invention, attached to a stepper motor.
Figure 4:
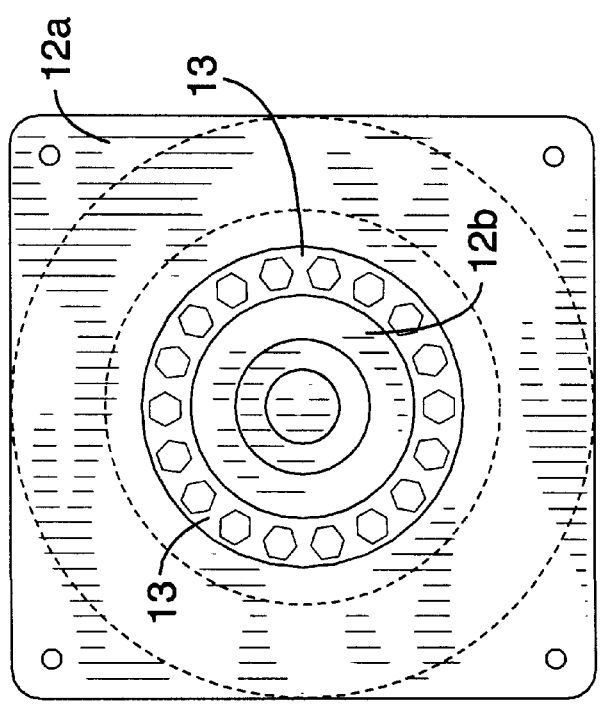
FIG. 4 shows a front view of a flange for mounting a stepper motor in accordance with the invention, attached to a stepper motor.

Referring to FIG. 5, a stepper motor 1 can be mounted with a flange 11 that is made of two pieces 12(*a*) and 12(*b*) that are free to rotate a small amount with respect to each other by means of a flexible connecting material 13. Flange 11 will enable the stepper motor 1 to be firmly attached to a machine or device in a manner almost identical to that of using the mounting holes typically provided in the external housing and frame 2, yet still allow the external housing and frame 2 to rotate a small amount with respect to the rotor assembly 4.

Figure 6:
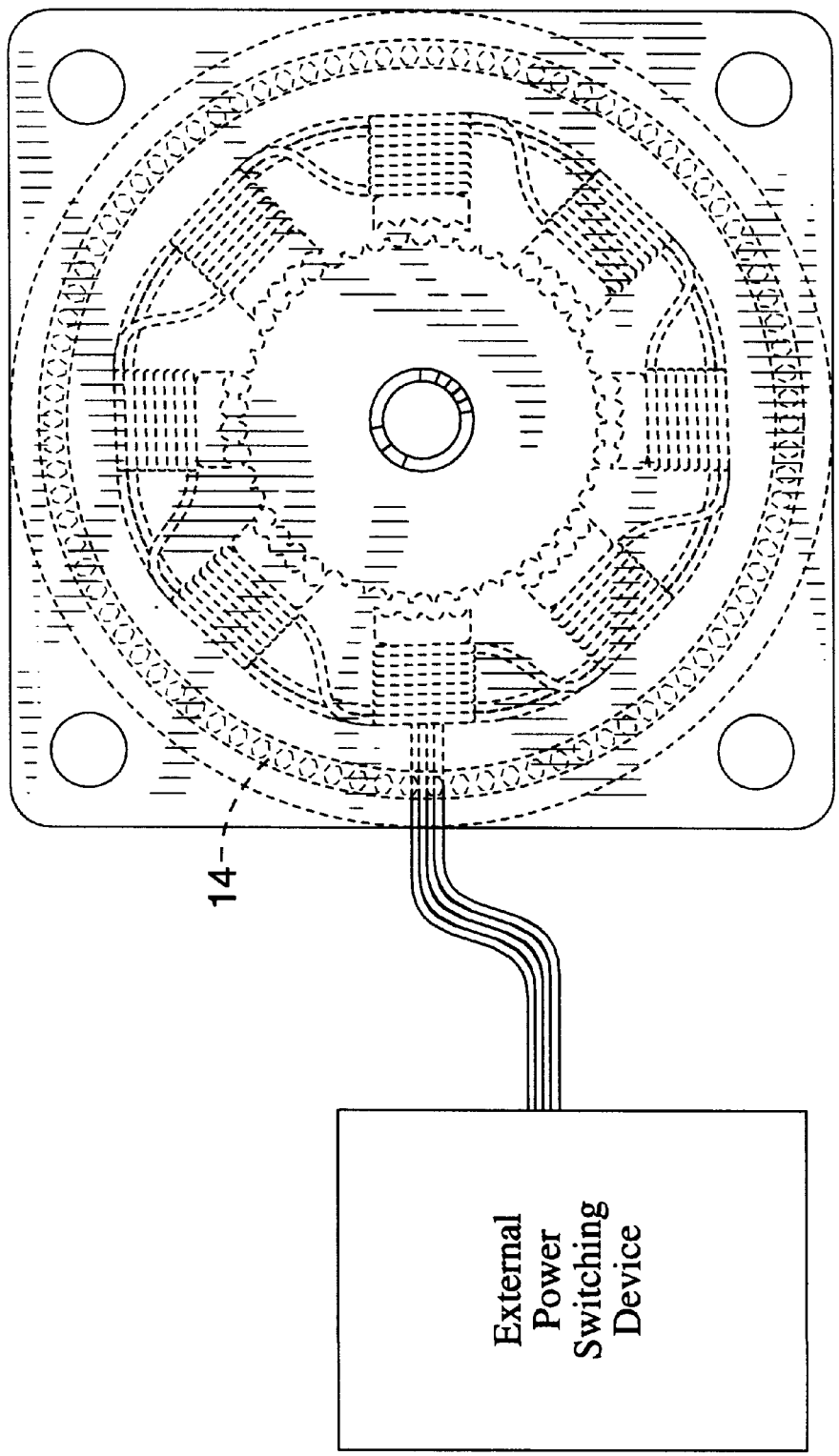
FIG. 6 schematically shows a stepper motor in cross-section that has been modified with a flexible coupling between the external housing and frame and the stator assembly in accordance with the invention and connected to an external power switching circuit.

Referring to FIG. 6, a stepper motor 1 can be manufactured in a manner as shown that separates the industry standard external housing and frame 3 from the stator assembly 2 by means of a flexible coupling material 14, but that holds external housing and frame 3 to the stator assembly 2 in such a manner as to permit a small amount of rotation between the stator assembly 2 and the rotor assembly 4.

Although the description above contain many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An apparatus for reducing the effect of mechanical energy waves that exert rotational forces upon a rotor assembly in a stepper motor that are detrimental to the torque output and dynamic speed range of said motor, comprising:

(a) a mounting bracket for holding a stepper motor having a stator assembly and a rotor assembly in a manner that permits the stator assembly to rotate clockwise or counterclockwise relative to the rotor assembly, depending upon direction and amount of force on the rotor assembly exerted by said mechanical energy waves, said stepper motor having an outer housing, said mounting bracket having an inside surface, said mounting bracket comprising (i) a rigid assembly ma de of a solid material that surrounds the outer housing of the stepper motor but does not touch the housing of said stepper motor, wherein an air gap exists between the inside surface of the mounting bracket and the outer housing of the stepper motor, said air gap being of sufficient size to permit the placement of a flexible material therein, (ii) a flexible material located between the inner surface of the mounting bracket and the outer housing of the stepper motor, said flexible material contacting the inner surface of the mounting bracket and the outer housing of the stepper motor with sufficient force to firmly hold the motor in place during operation, (iii) said flexible material having properties of low brittleness, high elasticity and high damping, with a thickness and shape so as to contact the inside surface of the mounting bracket and the outside of the motor housing with sufficient force to hold stepper motor in place for operation, but allow the stepper motor to rotate clockwise and counterclockwise during periods when mechanical energy waves act upon the rotor assembly in a manner detrimental to the torque output and dynamic speed of said stepper motor; and (b) means for adjusting amount of clockwise or counterclockwise rotation of the stator assembly in response to said mechanical energy waves.

2. A method for reducing the effects of mechanical energy waves that exert rotational forces upon a rotor assembly in a stepper motor that are detrimental to the torque output and dynamic speed range of said motor, comprising the steps of:

(a) providing a mounting bracket for holding a stepper motor having a stator assembly and a rotor assembly in a manner that permits the stator assembly to rotate clockwise or counterclockwise relative to the rotor assembly, depending upon direction and amount of force on the rotor assembly exerted by said mechanical energy waves, said stepper motor having an outer housing, said mounting bracket having an inside surface, said mounting bracket comprising (i) a rigid assembly made of a solid material that surrounds the outer housing of said stepper motor but does not touch the housing of said stepper motor, wherein an air gap exists between the inside surface of the mounting bracket and the outer housing of the stepper motor, said air gap being of sufficient size to permit the placement of a flexible material therein, and (ii) a flexible material located between the inner surface of the mounting bracket and the outer housing of the stepper motor, said flexible material contacting the inner surface of the mounting bracket and the outer housing of said stepper motor with sufficient force to firmly hold the motor in place during operation, (iii) said flexible material having properties of low brittleness, high elasticity and high damping, with a thickness and shape so as to contact the inside surface of the mounting bracket and the outside of the motor housing with sufficient force to hold the said stepper motor in place for operation, but allow the stepper motor to rotate clockwise and counterclockwise during periods when mechanical energy waves act upon the rotor assembly in a manner detrimental to the torque output and dynamic speed of said stepper motor; and (b) providing means for adjusting amount of rotation of the stator assembly in response to said mechanical energy waves.

3. An apparatus for reducing the effect of mechanical energy waves that exert rotational forces upon a rotor assembly in a stepper motor that are detrimental to the torque output and dynamic speed range of said motor, said stepper motor having a stator assembly, said stepper motor having a rear side, comprising:

(a) a stepper motor housing that permits the stator assembly in said stepper motor to rotate clockwise or counterclockwise relative to the rotor assembly in a manner that depends upon direction and amount of force on the rotor assembly exerted by said mechanical energy waves, said stepper motor housing comprising
  (i) a rigid face plate assembly made of a solid material through which the rotor assembly extends and which has means for attaching said rigid face plate assembly to a machine or device,
  (ii) a rigid outer housing for the stator assembly and rear side of said stepper motor which holds in place the remaining parts of said stepper motor,
  (iii) a flexible material located between said rigid face plate assembly and said rigid outer housing of said stepper motor, said flexible material joining the rigid face plate and the rigid outer housing with sufficient force to firmly hold said stepper motor together during operation,
  (iv) said flexible material having properties of low brittleness, high elasticity and high damping, with a thickness and shape, so as to attach the rigid face plate assembly to the rigid outer housing such that the said stepper motor is held together for operation, wherein the rigid outer housing, including the stator assembly, is allowed to rotate clockwise and counterclockwise during periods when mechanical energy waves act upon the rotor assembly in a manner detrimental to the torque output and dynamic speed of said stepper motor; and
(b) means for adjusting amount of clockwise or counterclockwise rotation of the stator assembly in response to said mechanical energy waves.

4. A method for reducing the effects of mechanical energy waves that exert rotational forces upon a rotor assembly in a stepper motor that are detrimental to the torque output and dynamic speed rang of said motor, said stepper motor having a stator assembly, said stepper motor having a rear side, comprising the steps of:

(a) providing a stepper motor housing that permits the stator assembly in said stepper motor to rotate clockwise or counterclockwise relative to the rotor assembly depending upon the direction and amount of force on the rotor assembly exerted by said mechanical energy waves, said stepper motor housing comprising:
  (i) a rigid face plate assembly made of a solid material through which the rotor assembly extends and which has means for attaching said rigid face plate assembly to a machine or device,
  (ii) a rigid outer housing for the stator and rear side of said stepper motor which holds in place the remaining parts of said stepper motor,
  (iii) a flexible material located between said rigid face plate assembly and the rigid outer housing, said flexible material joining the rigid face plate and the rigid outer housing with sufficient force to firmly hold said stepper motor together during operation,
  (iv) said flexible material having properties of low brittleness, high elasticity and high damping, with a thickness and shape, so as to attach the rigid face plate assembly to the rigid outer housing such that the said stepper motor is held together for operation, wherein the rigid outer housing, including the stator, is allowed to rotate clockwise and counterclockwise during periods when mechanical energy waves act upon the rotor assembly in a manner detrimental to the torque output and dynamic speed of said stepper motor; and
(b) providing means for adjusting amount of rotation of the stator assembly in response to said mechanical energy waves.

5. An apparatus for reducing the effect of mechanical energy waves that exert rotational forces upon a rotor assembly in a stepper motor that are detrimental to the torque output and dynamic speed range of said motor, comprising:

(a) a mounting bracket for holding a stepper motor having a stator assembly and a rotor assembly in a manner that permits the stator assembly to rotate clockwise or counterclockwise relative to the rotor assembly, depending upon direction and amount of force on the rotor assembly exerted by said mechanical energy waves, said stepper motor having an output face with mounting holes, said mounting bracket comprising:
  (i) first and second rigid assemblies made of a solid material, said first rigid assembly having mounting holes that mate to the mounting holes on the output face of said stepper motor, said second rigid assembly having mounting holes that mate to a machine or device to which said stepper motor is connected, said first and second rigid assemblies being connected to each other with a flexible material,
  (ii) said flexible material having properties of low brittleness, high elasticity and high damping, with a thickness and shape, so as to hold said first and second rigid assemblies together with sufficient force such that the said stepper motor is held in place for operation, said flexible material having sufficient flexibility to allow said first rigid assembly to rotate with said stepper motor clockwise and counterclockwise during periods when mechanical energy waves act upon the rotor assembly in a manner detrimental to the torque output and dynamic speed of said stepper motor; and
(b) means for adjusting amount of clockwise or counterclockwise rotation of the stator assembly in response to said mechanical energy waves.

6. A method for reducing the effects of mechanical energy waves that exert rotational forces upon a rotor assembly in a stepper motor that are detrimental to the torque output and dynamic speed rang of said motor, said stepper motor having a stator assembly, said stepper motor having a rear side, comprising the steps of:

(a) providing a mounting bracket for holding said stepper motor in a manner that permits the stator assembly to rotate clockwise or counterclockwise relative to the rotor assembly, depending upon direction and amount of force on the rotor assembly exerted by said mechanical energy waves, said stepper motor having an output face with mounting holes, said mounting bracket comprising
  (i) first and second rigid assemblies made of a solid material, said first rigid assembly having mounting holes that mate to the mounting holes on the output face of said stepper motor, said second rigid assembly having mounting holes that mate to a machine or device to which said stepper motor is connected, said first and second rigid assemblies being connected to each other with a flexible material, (ii) said flexible material having properties of low brittleness, high elasticity and high damping, with a thickness and shape, so as to hold said first and second rigid assemblies together with enough force such that the said stepper motor is held in place for operation, said flexible material having sufficient flexibility to allow said first rigid assembly to rotate with said stepper motor clockwise and counterclockwise during periods when mechanical energy waves act upon the rotor assembly in a manner detrimental to the torque output and dynamic speed of said stepper motor; and (b) providing means for adjusting amount of rotation of the stator assembly in response to said mechanical energy waves.

* * * * *